United States Patent [19]

Oouchi

[11] Patent Number: 5,764,232

[45] Date of Patent: Jun. 9, 1998

[54] THREE-DIMENSIONAL SIMULATOR APPARATUS AND IMAGE SYNTHESIS METHOD

[75] Inventor: Satoru Oouchi, Yokohama, Japan

[73] Assignee: Namco Ltd., Tokyo, Japan

[21] Appl. No.: 640,982

[22] PCT Filed: Sep. 14, 1995

[86] PCT No.: PCT/JP95/01833

§ 371 Date: May 9, 1996

§ 102(e) Date: May 9, 1996

[87] PCT Pub. No.: WO96/08298

PCT Pub. Date: Mar. 21, 1996

[30] Foreign Application Priority Data

Sep. 16, 1994 [JP] Japan .................................. 6-248691

[51] Int. Cl.$^6$ ................................................ G06T 17/00
[52] U.S. Cl. .................................................. 345/419
[58] Field of Search ................................ 395/118, 119, 395/120, 125, 129, 133; 345/418, 419, 420, 425, 429, 433

[56] References Cited

FOREIGN PATENT DOCUMENTS

A-59-99477 6/1984 Japan .
A-1-114990 5/1989 Japan .

*Primary Examiner*—Anton Fetting
*Assistant Examiner*—Cliff N. Vo
*Attorney, Agent, or Firm*—Oliff & Berridge, PLC

[57] ABSTRACT

This invention provides a three-dimensional (3D) simulator apparatus that is capable of forming a high-quality pseudo-3D image in real time, even when a large number of display objects crowd in close to a given viewpoint. An object image information storage section (212) stores image information for a plurality of types of objects with differing numbers of polygons (resolutions). A first setting unit (120) sets resolutions in such a manner that the resolution of a display object increases as the sequence number group to which the sequence number of the display object belongs gets closer to the viewpoint. A second setting unit (122) sets resolutions in such a manner that the resolution of a display object increases as the distance range in which the display object is positioned comes closer to the viewpoint. The setting made by the second setting unit (122) is modified by the setting result of the first setting unit (120).

12 Claims, 15 Drawing Sheets

FIG. 7

DISPLAY OBJECT INFORMATION

| DISPLAY OBJECT NUMBER (ADDRESS) | DISPLAY OBJECT TYPE INFORMATION | POSITION INFORMATION | | | ORIENTATION INFORMATION | | | DETAIL VALUE |
|---|---|---|---|---|---|---|---|---|
| a | Sam | $X_a$ | $Y_a$ | $Z_a$ | $\theta_a$ | $\phi_a$ | $\rho_a$ | $D_a$ |
| b | Sbm | $X_b$ | $Y_b$ | $Z_b$ | $\theta_b$ | $\phi_b$ | $\rho_b$ | $D_b$ |
| c | Scm | $X_c$ | $Y_c$ | $Z_c$ | $\theta_c$ | $\phi_c$ | $\rho_c$ | $D_c$ |
| d | Sdm | $X_d$ | $Y_d$ | $Z_d$ | $\theta_d$ | $\phi_d$ | $\rho_d$ | $D_d$ |
| e | Sem | $X_e$ | $Y_e$ | $Z_e$ | $\theta_e$ | $\phi_e$ | $\rho_e$ | $D_e$ |
| f | Sfm | $X_f$ | $Y_f$ | $Z_f$ | $\theta_f$ | $\phi_f$ | $\rho_f$ | $D_f$ |
| g | Sgm | $X_g$ | $Y_g$ | $Z_g$ | $\theta_g$ | $\phi_g$ | $\rho_g$ | $D_g$ |
| ⋮ | ⋮ | ⋮ | ⋮ | ⋮ | ⋮ | ⋮ | ⋮ | ⋮ |

FIG. 11A

SEQUENCE NUMBER DETAIL TABLE FOR MAIN SCREEN

| SEQUENCE NUMBER | 1 | 2 | 3 | 4 |
|---|---|---|---|---|
| FIRST DETAIL VALUE | 1 | 1 | 2 | 2 |
| SEQUENCE NUMBER | 5 | 6 | 7 | 8 |
| FIRST DETAIL VALUE | 3 | 3 | 3 | 3 |
| | | | | |

FIG. 11B

SEQUENCE NUMBER DETAIL TABLE FOR SIDE MIRROR

| SEQUENCE NUMBER | 1 | 2 | 3 | 4 |
|---|---|---|---|---|
| FIRST DETAIL VALUE | 2 | 2 | 3 | 3 |
| SEQUENCE NUMBER | 5 | 6 | 7 | 8 |
| FIRST DETAIL VALUE | 3 | 3 | 3 | 3 |
| | | | | |

FIG. 12

DISTANCE DETAIL TABLE

| DISTANCE (m) | $0 \leq L < 6$ | $6 \leq L < 12$ | $12 \leq L < 18$ | $18 \leq L < 24$ |
|---|---|---|---|---|
| SECOND DETAIL VALUE | 1 | 1 | 1 | 1 |
| DISTANCE (m) | $24 \leq L < 30$ | $30 \leq L < 36$ | $36 \leq L < 42$ | $42 \leq L < 48$ |
| SECOND DETAIL VALUE | 1 | 2 | 2 | 2 |
| DISTANCE (m) | $48 \leq L < 54$ | $54 \leq L < 60$ | $60 \leq L < 66$ | $66 \leq L < 72$ |
| SECOND DETAIL VALUE | 2 | 2 | 2 | 2 |
| DISTANCE (m) | $72 \leq L < 78$ | $78 \leq L < 84$ | $84 \leq L < 90$ | $90 \leq L < 96$ |
| SECOND DETAIL VALUE | 2 | 2 | 2 | 3 |
| DISTANCE (m) | $96 \leq L < 102$ | $102 \leq L < 108$ | $108 \leq L < 114$ | $114 \leq L < 120$ |
| SECOND DETAIL VALUE | 3 | 3 | 3 | 3 |
| DISTANCE (m) | $120 \leq L < 126$ | $126 \leq L < 132$ | $132 \leq L < 138$ | $138 \leq L < 144$ |
| SECOND DETAIL VALUE | 3 | 3 | 3 | 3 |

HIGH-DETAIL
DETAIL VALUE = 1

MEDIUM-DETAIL
DETAIL VALUE = 2

LOW-DETAIL
DETAIL VALUE = 3 a collection of a plurality of polygons, for example, the resolution of the display object can be increased by using an object with a large number of polygons and the resolution can be reduced by using an object with a small number of polygons.

THREE-DIMENSIONAL SIMULATOR APPARATUS AND IMAGE SYNTHESIS METHOD

TECHNICAL FIELD

This invention relates to a three-dimensional (3D) simulator apparatus capable of simulating a virtual 3D space, and an image synthesis method used therein.

BACKGROUND ART

Various types of 3D simulator apparatus that are used in applications such as 3D games or piloting simulators for aircraft or other moving bodies are known in the art. With such a 3D simulator apparatus, image information relating to a 3D object 300 shown in FIG. 15A is previously stored within the apparatus. This 3D object 300 depicts an element such as scenery that can be seen by a player (observer) 302 as if through a screen 306. This display object is displayed as a pseudo-3D image (projected image) 308 on the screen 306, by perspective projection conversion on the screen 306 of the image information of the 3D object 300. When the player 302 specifies operations such as rotation or translation through a control panel 304, this apparatus performs predetermined 3D computation processing on the basis of the resultant operating signals. More specifically, computations are first performed to determine whether a change has occurred, such as a change in the viewpoint or direction of gaze of the player 302 or a change in the position or orientation of a moving body in which the player 302 is sitting, as specified by these operating signals. Computations are then performed to determine how the image of the 3D object 300 can be seen on the screen 306, in accordance with this change such as a change in viewpoint or direction of gaze. The above computations are performed in real time, following the actions of the player 302. This makes it possible for the player 302 to see any change in the scenery, due to a change in the player's own viewpoint or direction of gaze or a change in the position or orientation of the moving body in which the player is sitting, as a pseudo-3D image in real time, to simulate the experience of a virtual 3D space.

An example of a displayed image formed by a 3D simulator apparatus as described above is shown in FIG. 15B.

In a 3D simulator apparatus of this type, each display object such as a racing car is represented by an object that is a collection of a plurality of polygons. In this case, if the number of polygons of an object representing a display object is large, the display object can be represented in detail and thus the image quality can be increased. However, if objects with large numbers of polygons are used for all of the display objects, a problem arises in that the amount of data to be subjected to computation processing expands. With a 3D simulator apparatus in which image synthesis processing must be done in real time, there is a limit on the amount of data that can be processed within a predetermined period. Therefore, if the amount of data to be processed expands, some of the data will not be processed and thus various problems will occur such as a dramatic slowdown in the movement of the player's viewpoint, the scene will skip as if in a slow-motion playback, or a large number of objects will disappear.

One method of solving these problems that has been considered is to use different numbers of polygons for objects representing display objects, in accordance with a factor such as the distance from the viewpoint of the player. In other words, this method uses an object with a large number of polygons for a display object that is nearby, but an object with a small number of polygons for a display object that is far away. However, this method raises a further problem as described below. In a racing car game, for example, a case could be considered in which opponents' racing cars approach the player-operated car, so that a plurality of racing cars crowd close in the game scene seen by the player. In such a case, since the distance between the player's viewpoint and this plurality of racing cars is extremely small, the above described method would result in all of these racing cars being represented by objects with extremely high numbers of polygons (highly detailed objects). Thus the amount of data (number of polygons) to be processed at that point (in that field) will be extremely large, and problems such as the above described failure of objects to appear will occur. This technical problem relating to the formation of a high-quality image in real time has not been sufficiently addressed in this prior-art example of a 3D simulator apparatus.

DISCLOSURE OF THE INVENTION

This invention was devised with the intention of solving the above technical problems and has as an objective thereof the provision of a 3D simulator apparatus and image synthesis method that can form a high-quality pseudo-3D image in real time, even when a large number of display objects crowd in close to the player's viewpoint.

In order to solve the above described problems, a first aspect of this invention concerns a three-dimensional (3D) simulator apparatus comprising: image synthesis means for synthesizing a field-of-view image as seen from a given viewpoint within a virtual 3D space; first setting means for setting the resolution of a display object having a sequence number included in a Kth sequence number group to a higher level than the resolution of a display object having a sequence number included in a (K+1)th sequence number group, first to Mth (where M is an integer) sequence number groups grouping sequence numbers that are allocated to display objects in sequence of increasing distance from the viewpoint, the Kth (where K is an integer such that $1 \leq K < M$) sequence number group including a sequence number that is allocated to a display object closer to the viewpoint than the (K+1)th sequence number group.

With this aspect of the invention, sequence numbers are allocated to display objects in sequence of increasing distance from the viewpoint, and first to Mth sequence number groups, such as first, second, and third sequence number groups are determined on the basis of these sequence numbers. In this case, the first sequence number group comprises sequence numbers allocated to display objects close to the viewpoint and the third sequence number group comprises sequence numbers allocated to display objects far from the viewpoint. A high resolution is set for a display object when the sequence number of the display object is within the first sequence number group, an intermediate resolution is set when it is within the second sequence number group, and a low resolution is set when it is within the third sequence number group. This makes it possible to optimize the resolution of the display object from consideration of the number of display objects crowding in close to the viewpoint, not just from the distance between the viewpoint and each display object. As a result, problems such as a deterioration in image quality caused by an increase in the amount of computation processing can be prevented, even when display objects crowd in close to the viewpoint. When each display object is represented by objects that are assemblies of polygons, note that the setting of the resolution of each display object can be implemented by different number of polygons for these objects. However, taking a racing car as an example of a display object, additional effects can be performed, such as the action of the suspension and also the eruption of a backfire in a high-resolution racing car, where there is no suspension action in medium- and low-resolution racing cars.

In addition, each sequence number group need not necessarily comprise a plurality of sequence numbers; sequence numbers and sequence number groups could be in a one-to-one relationship.

A second aspect of this invention concerns a 3D simulator apparatus further comprising second setting means for setting the resolution of a display object positioned within an Lth distance range to a higher level than the resolution of a display object positioned within an (L+1)th distance range, first to Nth (where N is an integer) distance ranges demarcating distances between the viewpoint and display objects, the Lth (where L is an integer such that $1 \leq L < N$) distance range being closer to the viewpoint than the (L+1)th distance range; and means for modifying the resolution of a display object set by the second setting means in accordance with the setting of the first setting means.

With this aspect of the invention, first to Nth distance ranges, such as first, second, and third distance ranges, are determined on the basis of the distance between the viewpoint and each display object. In this case, the first distance range is a distance range close to the viewpoint and the third distance range is a distance range far from the viewpoint. The resolution of a display object is set to be high when the position of the display object is within the first distance range, intermediate when it is within the second distance range, and low when it is within the third distance range. With this invention, after a resolution has been set on the basis of a distance range, this setting is modified on the basis of a sequence number group. This makes it possible to optimize the resolution of display objects when display objects crowd in close to the viewpoint. As a result, effective image synthesis processing can be made and problems such as a deterioration in image quality can be prevented.

Note that the resolution set by the first setting means may be modified in accordance with the setting of the second setting means. In this case, the resolution of the display object is first set on the basis of a sequence number group, and then the resolution is modified on the basis of a distance range.

A third aspect of this invention concerns a 3D simulator apparatus comprising: image synthesis means for synthesizing a field-of-view image as seen from a given viewpoint within a virtual 3D space; means for setting resolutions of display objects in such a manner that the resolution of a display object closer to the viewpoint is higher, on the basis of a sequence number group to which a sequence number allocated to the display object belongs and a distance range within which the display object is positioned, first to Mth (where M is an integer) sequence number groups grouping sequence numbers that are allocated to display objects in sequence of increasing distance from the viewpoint, a Kth (where K is an integer such (that $1 \leq K < M$) sequence number group including a sequence number that is allocated to a display object closer to the viewpoint than a (K+1)th sequence number group, first to Nth (where N is an integer) distance ranges demarcating distances between the viewpoint and display objects, an Lth (where L is an integer such that $1 \leq L < N$) distance range being closer to the viewpoint than an (L+1)th distance range.

With this aspect of the invention, the resolution of a display object is determined on the basis of the sequence number group and distance range to which this display object belongs. In this case, a resolution set on the basis of a distance range could be modified on the basis of a sequence number group, in the same manner as described above, or tables storing resolution information corresponding to the sequence number group and distance range to which the display object belongs could be prepared and the resolution of the display object could be set on the basis of resolution information read from these tables.

A fourth aspect of this invention concerns a 3D simulator apparatus comprising: image synthesis means for synthesizing a field-of-view image as seen from a given viewpoint within a virtual 3D space; a first resolution information table for storing first resolution information, which is information specifying resolutions for display objects and which is linked to first to Mth sequence number groups, first to Mth (where M is an integer) sequence number groups grouping sequence numbers that are allocated to display objects in sequence of increasing distance from the viewpoint, a Kth (where K is an integer such that $1 \leq K < M$) sequence number group including a sequence number that is allocated to a display object closer to the viewpoint than the (K+1)th sequence number group; a second resolution information table for storing second resolution information, which is information specifying resolutions for display objects and which is linked to first to Nth distance ranges, first to Nth (where N is an integer) distance ranges demarcating distances between the viewpoint and display objects, an Lth (where L is an integer such that $1 \leq L < N$) distance range is closer to the viewpoint than an (L+1)th distance range; and means for reading out the second resolution information from the second resolution information table on the basis of a distance range within which a display object is positioned, reading out the first resolution information from the first resolution information table on the basis of a sequence number group to which a sequence number of the display object belongs, and allocating the first resolution information to the display object when the first resolution information specifies a resolution that is lower than that of the second resolution information.

With this aspect of the invention, first resolution information linked to sequence number groups is stored in a first resolution information table and second resolution information linked to distance ranges is stored in a second resolution information table. This first and second resolution information is information for setting the resolution of a display object. The first and second resolution information is read from the first and second resolution information tables on the basis of a sequence number of a display object and the position of the display object. If the first resolution information specifies a lower resolution than the second resolution information, the first resolution information is used as resolution information for the display object. Thus, the first resolution information is used when display objects crowd in close to the viewpoint, for example, and the second resolution information is used when display objects are crowding far from the viewpoint, so that the setting of resolutions can be optimized for the display objects.

In this case, the distance between the viewpoint and each display object in this invention is preferably a distance in the depth-of-vision direction of a viewpoint coordinate system. This ensures that distances in this depth-of-vision direction are used in the settings of sequence number groups and distance ranges, making it simpler to obtain these settings. It should be noted, however, that various other methods could be used for measuring such distances, such as straight lines connecting the viewpoint and the display objects. If straight lines connecting the viewpoint and the display objects are used, the settings of the sequence number groups can be done more accurately.

In such a case, the 3D simulator apparatus of this invention preferably also comprises means for storing image information for an object when each display object is represented by an object configured by a plurality of polygons, this object image information storage means stores image information for a plurality of types of objects with differing numbers of polygons, for at least some display objects, and an object with a larger number of polygons is selected from this plurality of types of objects for allocation to the display object as the resolution set for the display object increases. In other words, the resolution of each display object can be expressed by preparing a plurality of objects having differing numbers of polygons as objects used to represent display objects. Thus a high-resolution display object can be represented by an objects with a large numbers of polygon and a low-resolution display object can be represented by an object with a small number of polygons. This makes it possible for the present invention to optimize the setting of resolutions for display objects, even when display objects crowd in close to the viewpoint. In other words, it is not necessary to represent all of these nearby display objects by objects with large numbers of polygons, and, as a result, the number of polygons to be processed can be reduced, enabling real-time processing.

BRIEF DESCRIPTION OF DRAWINGS

FIG. 7 is a table used for illustrating display object information that is stored in the display object image information storage section;

FIGS. 11A and 11B show examples of sequence number detail tables;

FIG. 12 shows an example of a distance detail table;

BEST MODE FOR CARRYING OUT THE INVENTION

1. Outline of Game

An example of a 3D game enabled by the 3D simulator apparatus of this invention will first be briefly described.

Figure 2:
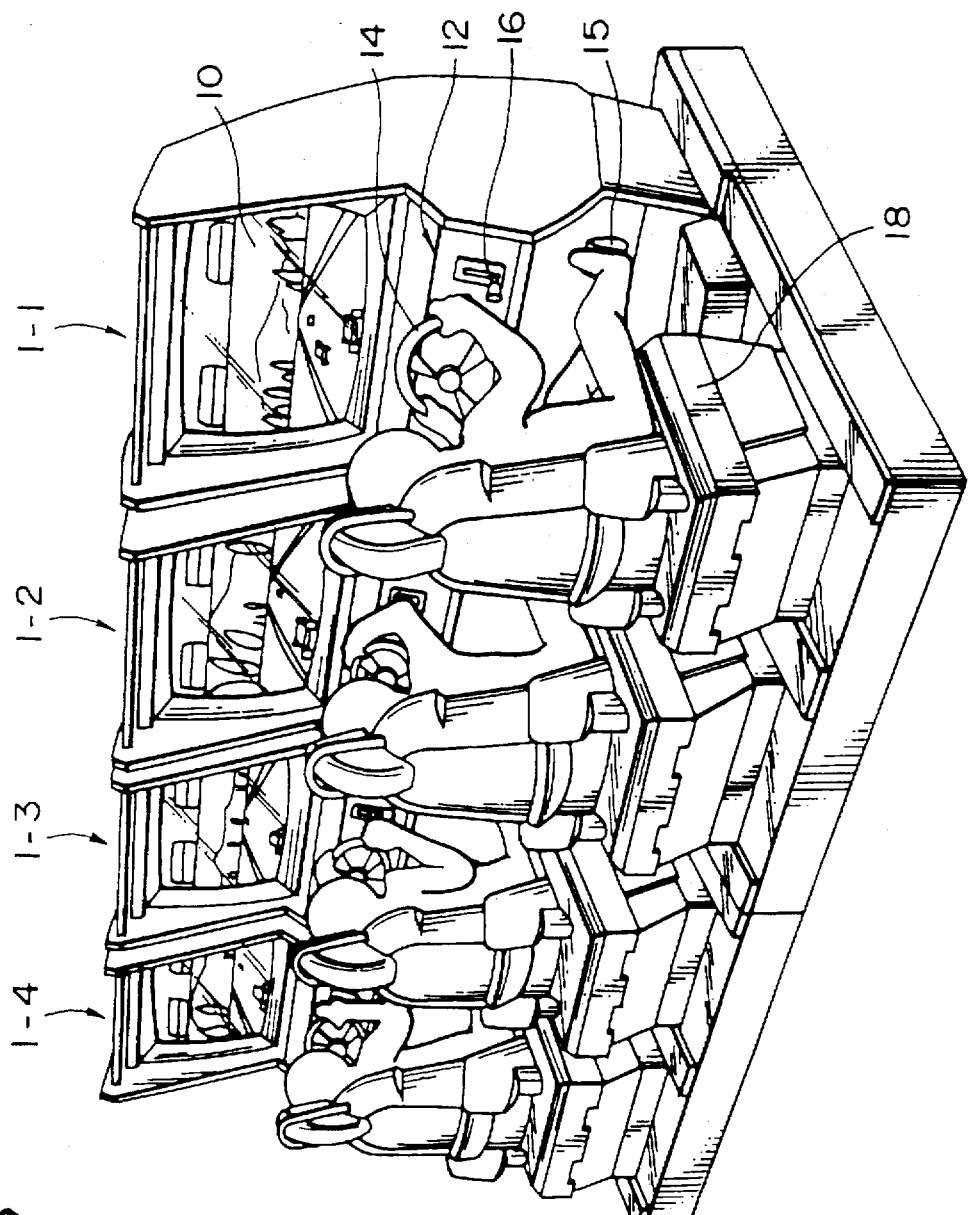
FIG. 2 shows an example of the exterior of this 3D simulator apparatus.

An example of this 3D simulator apparatus is shown in FIG. 2. In FIG. 2, a plurality of independent simulator apparatuses (games machines) 1-1, 1-2, 1-3, and 1-4 are mutually connected together by data transmission lines. This makes it possible for a racing car driven by a player (observer) to compete against other racing cars driven by other players or computer-operated cars operated by a computer.

In this case, "independent simulator apparatuses 1-1, 1-2, 1-3, and 1-4" means that each of the simulator apparatuses is configured in such a manner that it can be used independently to provide a single-player game. Of course, they can also be configured to allow a multi-player game in which opposing players compete within the same game space, via the data transmission lines.

Each of the simulator apparatuses shown in FIG. 2 is modeled in the same manner as the driving seat of a real racing car. The game is such that a player sits in a seat 18 and operates controls such as a steering wheel 14, an accelerator pedal 15, and a shift lever 16 provided on a control section 12, while watching a game scene (a pseudo-3D image of the surroundings as seen from the driving seat of a racing car) that is projected on a display 10.

Note that the 3D simulator apparatuses shown in FIG. 2 are configured for a multi-player game but the present invention is not limited thereto; it can equally well be applied to a single-player configuration.

Figure 3:
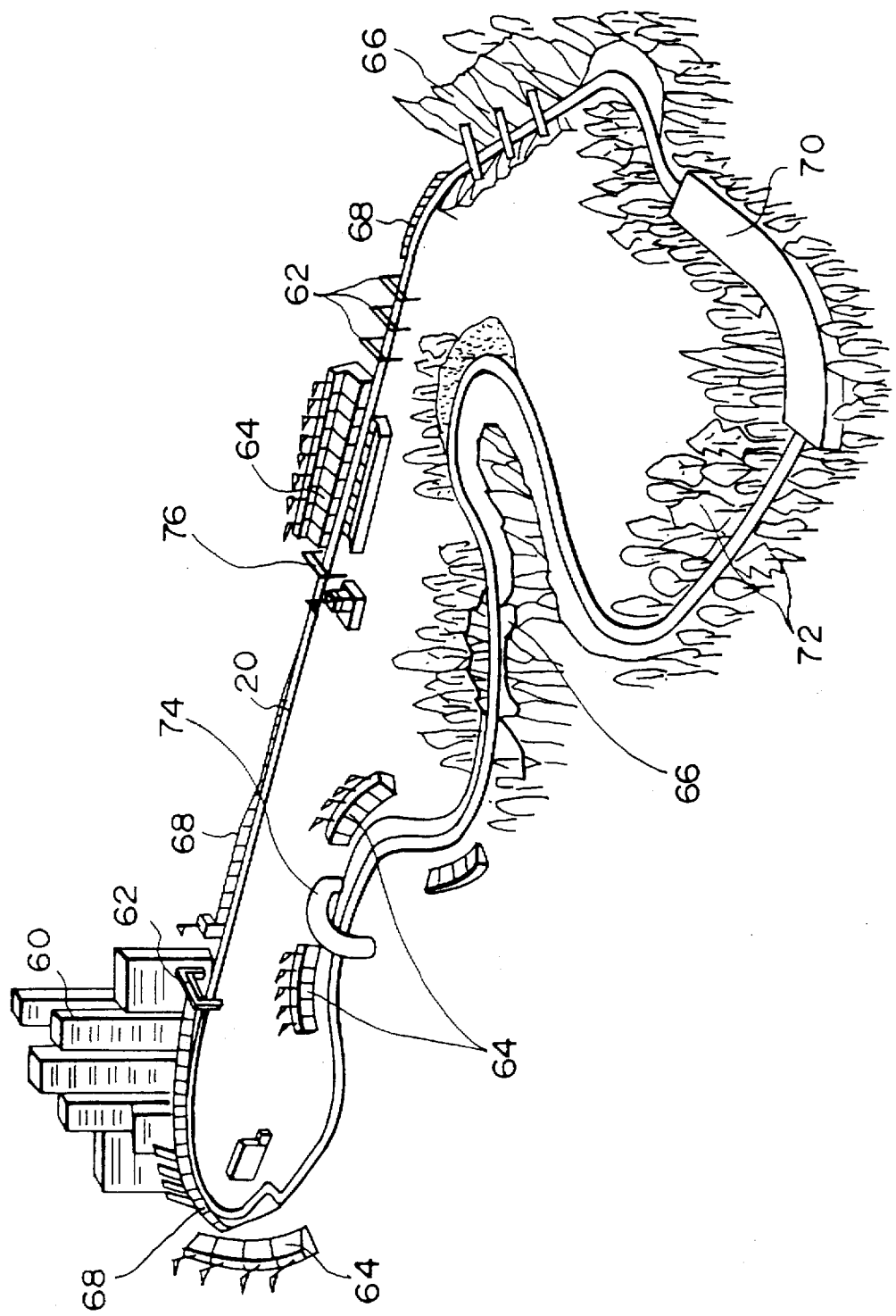
FIG. 3 shows an example of a virtual 3D space provided within this 3D game.

An example of the virtual 3D space displayed in this 3D game is shown in FIG. 3. This shows how a track 20 that is formed in a three-dimensional manner is laid out within the virtual 3D space of the 3D game. Various 3D objects such as buildings 60, arches 62, stands 64, cliffs 66, walls 68, a tunnel 70, trees 72, and a bridge 74 are laid out around the periphery of this track 20. The player operates the racing car while viewing the display 10 where this track and the other 3D objects are projected. The player starts from a starting line 76, drives around the track 20 a given number of times until he or she reaches a finishing line, and thus the player's ranking is determined.

Figure 4:
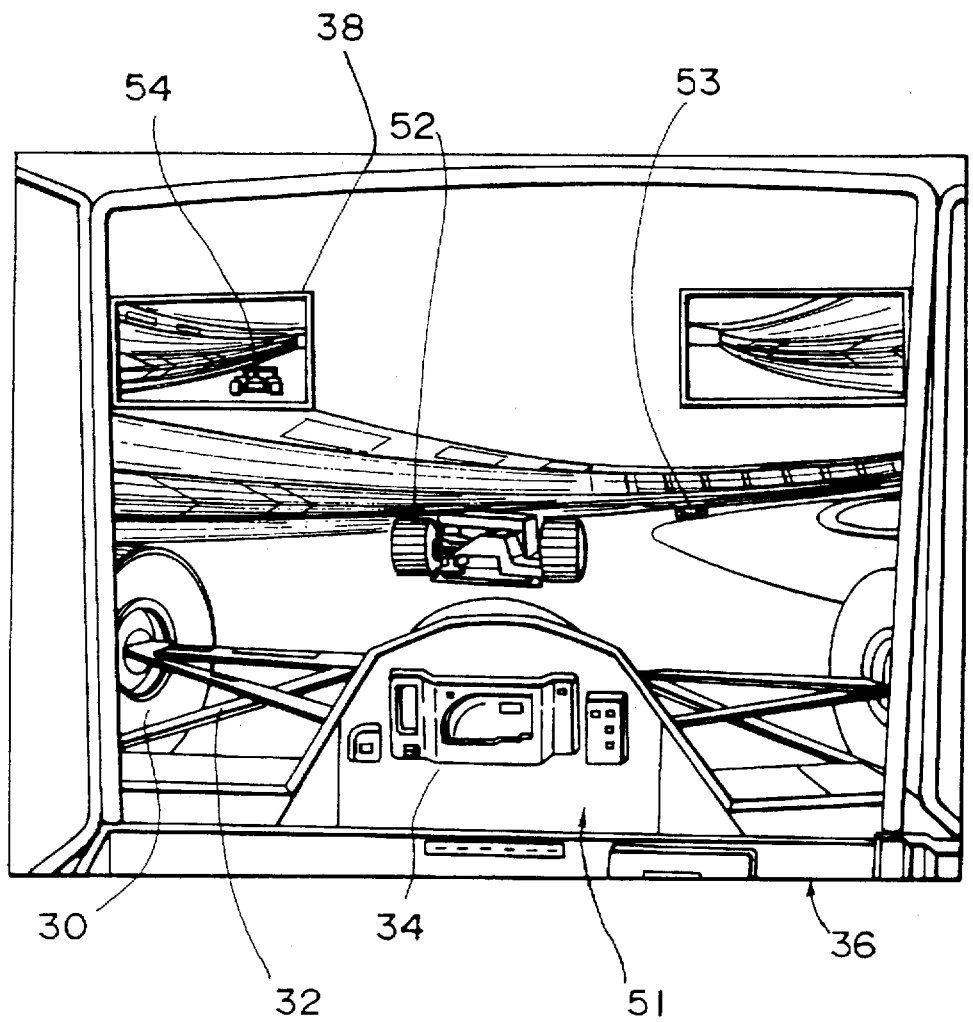
FIG. 4 shows an example of a game scene synthesized by this 3D simulator apparatus.
Figure 5:
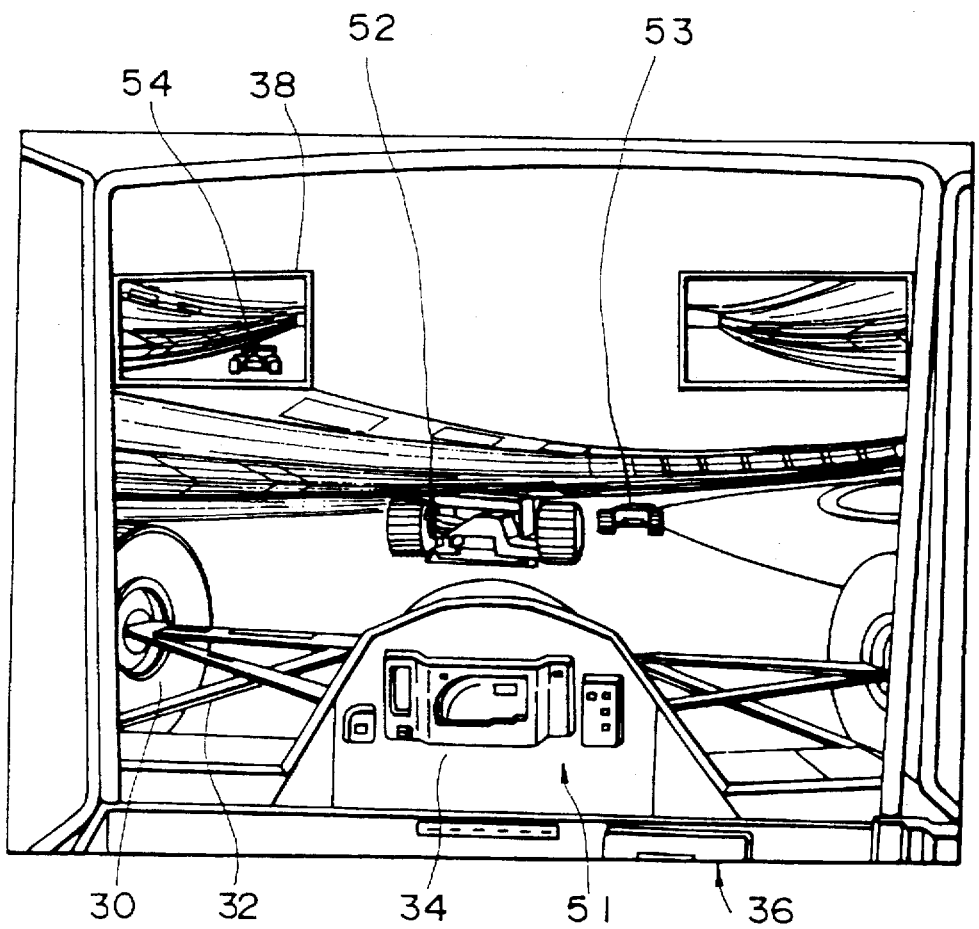
FIG. 5 shows another example of a game scene synthesized by this 3D simulator apparatus.

Examples of games scenes projected on the display 10 during this 3D game are shown in FIGS. 4 and 5. The player drives a player-operated car 51 while watching this game scene, and competes against another opponent's racing car 52 or a computer-operated car 53.

Since details of the player-operated car 51 (own car) such as tires 30, suspension 32, and instruments 34 are extremely close to the player's viewpoint, as shown in FIG. 4, it is represented by a highly detailed (high-resolution) object having a large number of polygons. Similarly, since the opponent's racing car 52 approaches to close to the player's own car, it is of course represented by a highly detailed object. On the other hand, the computer-operated car 53 is far from the player's own car 51 and thus is represented by a medium-detail object with an intermediate number of polygons or a low-detail object with a small number of polygons. An image of a side mirror 38 on a main screen 36 displays a scene that is more compressed than that of the main screen, so it is represented at a lower detail than the main screen.

A game scene in which the computer-operated car 53 has slowed down and approached the player's own car is shown in FIG. 5. In this case, the computer-operated car 53 has to be represented by a highly detailed object in the same manner as the opponent's racing car 52. However, if a plurality of racing cars were to crowd in close in this manner and all of them were represented by highly detailed objects, the amount of data (number of polygons) to be processed within one field of, for example, 1/60 seconds would expand. A highly detailed racing car object could be configured of 200 to 400 polygons.

Therefore, if all racing cars near to the player's own car are represented by highly detailed racing car objects, the number of polygons that has to be processed within one field will increase by that number (200 to 400) every time another racing car approaches, and thus problems such as a deterioration in image quality will occur.

To prevent such problems, in addition to using a method by which objects are ranked with distance into high-, medium, and low-detail objects, this embodiment of the invention uses a method of ranking these objects by allocating sequence numbers to the display objects. In FIG. 5, for example, sequence number 1 is allocated to the player-operated car 51 (own car), sequence number 2 is allocated to the opponent's racing car 52, and sequence number 3 is allocated to the computer-operated car 53. These sequence numbers are allocated in sequence from close to the player's viewpoint. The racing cars with sequence numbers 1 and 2 are represented by highly detailed objects, whereas racing cars with sequence numbers from 3 onward are represented by medium-detail (or low-detail) objects. By ensuring that the computer-operated car 53 is represented by a medium-detail object, this method prevents problems such as a deterioration in image quality caused by an increase in the amount of data to be processed that occurs when a number of racing cars crowd in close to the player's own car.

2. Description of Entire Apparatus

Figure 1:
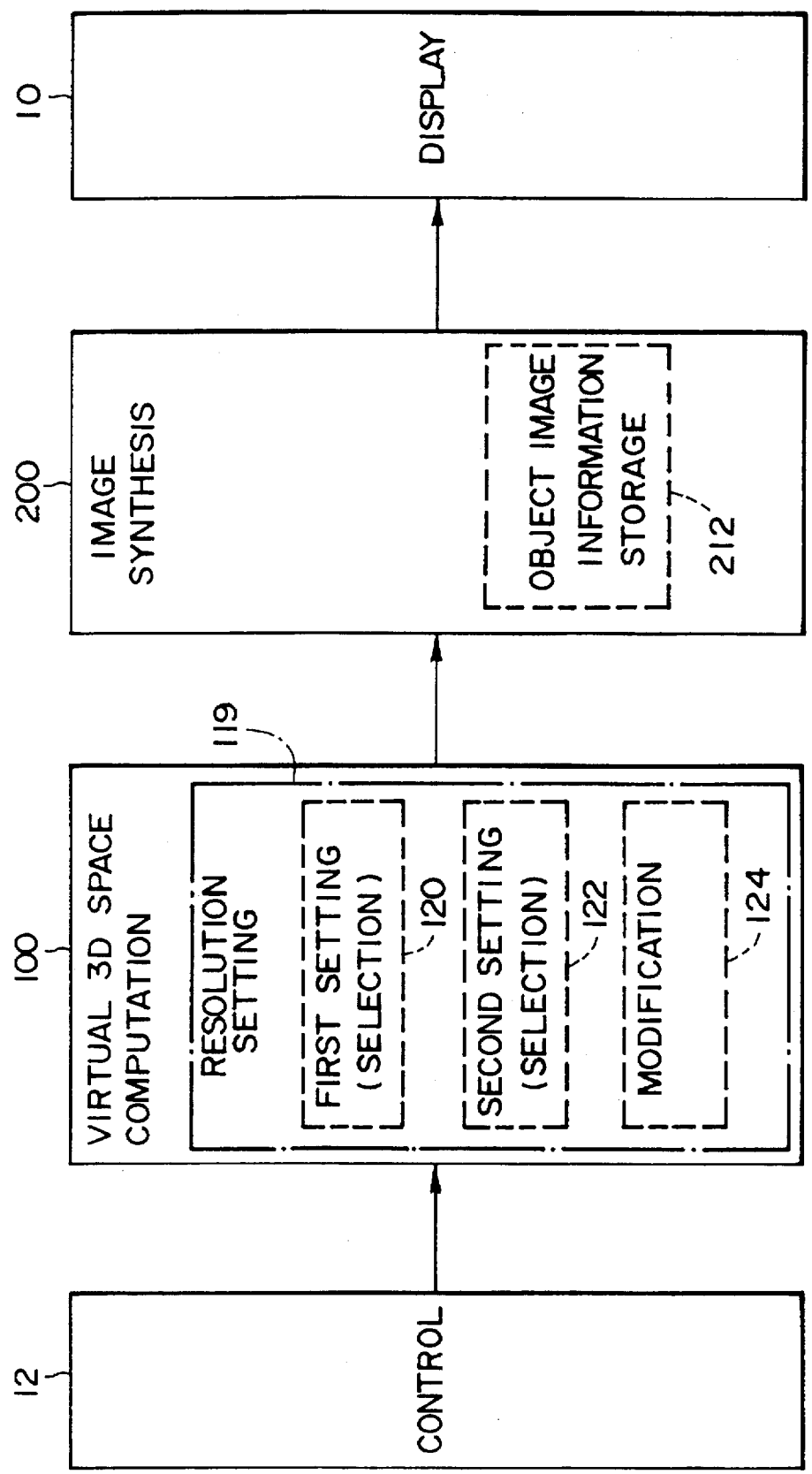
FIG. 1 is a representative block diagram of an embodiment in accordance with this invention.

A block diagram of an example of the 3D simulator apparatus to which this invention is applied is shown in FIG. 1.

As shown in FIG. 1, this 3D simulator apparatus comprises a control section 12 to which the player inputs operating signals, a virtual 3D space computation section 100 that performs computations for setting a virtual 3D space according to a given games program, an image synthesis section 200 that forms a pseudo-3D image as seen from the viewpoint of the player, and the display 10 that outputs this pseudo-3D image.

When this 3D simulator apparatus is applied to a racing car game, for example, the control section 12 is connected to controls such as the steering wheel 14 and accelerator pedal 15 for driving the racing car, and operating signals are input thereby.

The virtual 3D space computation section 100 performs computations to set either the position alone or the position and orientation of the plurality of display objects within the virtual 3D space shown in FIG. 3, such as the track 20, buildings 60, arches 62, stands 64, cliffs 66, the player's own racing car, other players' racing cars, and computer-operated cars. These computations are based on data such as operating signals from the control section 12 and map information that was stored previously.

The image synthesis section 200 performs computations to form a field-of-view image as seen from any desired viewpoint within the virtual 3D space, on the basis of the computation results from the virtual 3D space computation section 100. The thus formed field-of-view image is output by the display 10.

In this embodiment of the invention, the virtual 3D space computation section 100 comprises a resolution setting means 119 and this resolution setting means 119 comprises first and second setting (selection) means 120 and 122 and a modification means 124. The image synthesis section 200 comprises an object image information storage section 212. Object image information for representing a display object is stored in the object image information storage section 212. Taking racing car objects as an example, the object image information storage section 212 of this embodiment stores image information for a plurality of types of objects with differing numbers of polygons, such as image information for high-, medium-, and low-detail racing car objects (see FIGS. 13A to 13C).

The resolution setting means 119 sets a resolution in such a manner that a racing car closer to the player's viewpoint has a higher resolution, on the basis of a sequence number group or distance range to which each racing car belongs. More specifically, the second setting (selection) means 122 sets resolutions in such a manner that the resolution increases as the distance range in which each racing car is positioned gets closer to the viewpoint, so that an object with a larger number of polygons is selected thereby. In other words, highly detailed object image information is selected for the player's own car 51 and opponent's racing car 52 in FIG. 4, but medium-detail object image information is selected for the computer-operated car 53. However, since the computer-operated car 53 has come closer in FIG. 5, highly detailed object image information is selected for all of the player's own car 51, the opponent's racing car 52, and the computer-operated car 53.

The first setting (selection) means 120 sets resolutions in such a manner that the resolution of each display object increases as the sequence number group to which the sequence number of each racing car belongs gets closer to the player's viewpoint, so that an object with a larger number of polygons is selected thereby. For example, highly detailed object image information is selected for the player's own car (sequence number 1) and the opponent's racing car 52 (sequence number 2), but medium-detail object image information is selected for the computer-operated car 53 (sequence number 3), as shown in FIGS. 4 and 5.

With this embodiment, the setting of a resolution by the second setting means 122, such as the allocation of object image information, is modified on the basis of the setting result of the first setting means 120. This modification is performed by the modification means 124. For example, highly detailed object image information was allocated for the computer-operated car 53 in FIG. 5 by the setting of the second setting means 122, but this allocation is modified by the setting result of the first setting means 120 so that medium-detail object image information is allocated to the computer-operated car 53. This prevents the occurrence of an increase in the number of polygons that have to be processed in one field if the computer-operated car 53 suddenly approaches when the opponent's racing car 52 is already close to the player's own car (when racing cars crowd in on the player's own car), as shown in FIG. 5.

Figure 6:
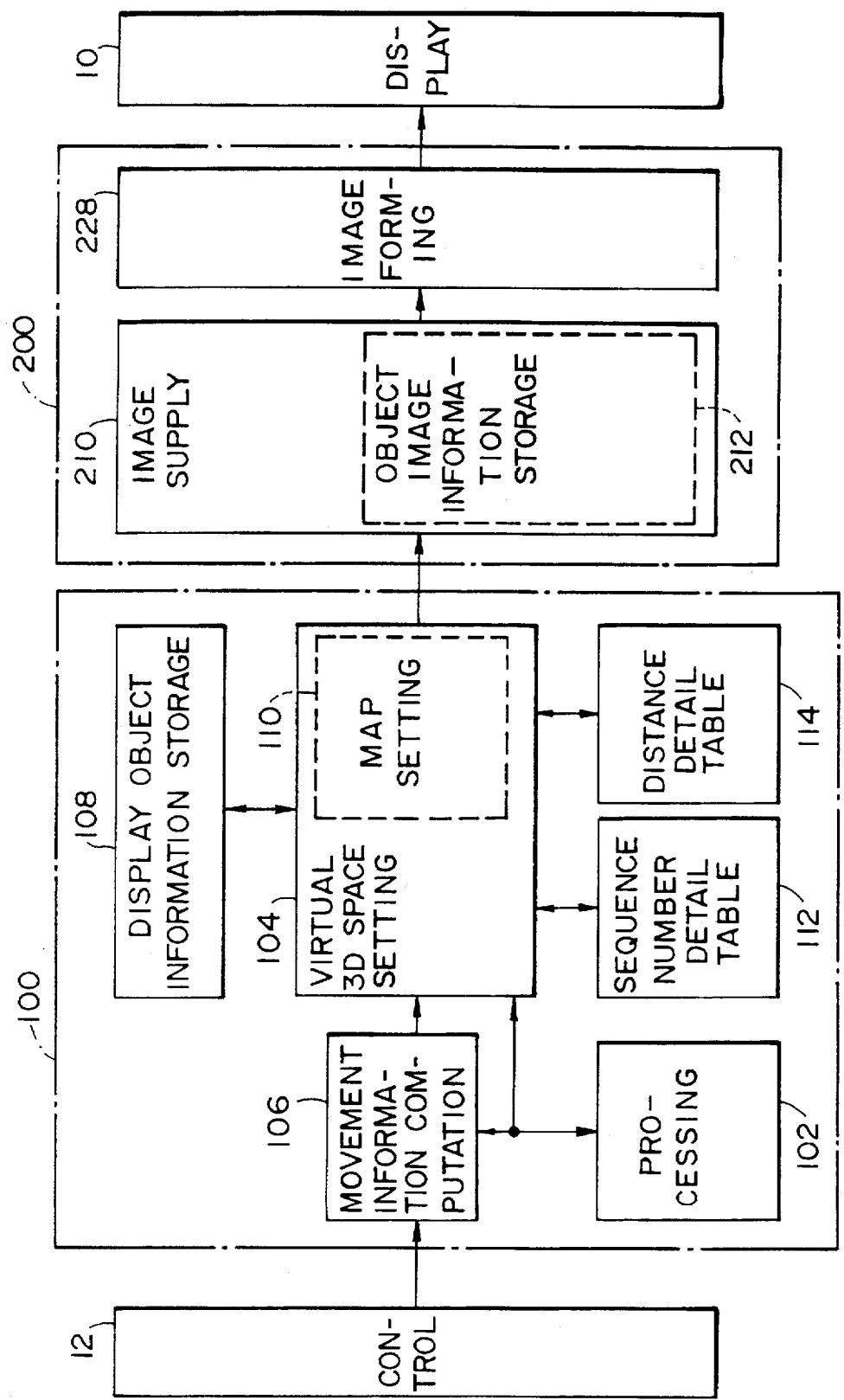
FIG. 6 is a representative block diagram of the virtual 3D space computation section and image synthesis section.

A block diagram of a specific example of the configuration of the virtual 3D space computation section 100 and image synthesis section 200 is shown in FIG. 6. It should be noted, however, that the configurations of the virtual 3D space computation means and image synthesis means of this invention are not limited to the embodiments shown in FIG. 6.

3. Description of Virtual 3D Space Computation Section As shown in FIG. 6, the virtual 3D space computation section 100 comprises a processing section 102, a virtual 3D space setting section 104, a movement information computation section 106, a display object information storage section 108, a sequence number detail table 112, and a distance detail table 114.

In this case, control of the entire 3D simulator apparatus is performed by the processing section 102. A given games program is stored within a memory section that is provided within the processing section 102. The virtual 3D space computation section 100 is designed to compute the setting of a virtual 3D space in accordance with this games program and operating signals from the control section 12.

Movement information for the racing car is computed by the movement information computation section 106 in accordance with data such as operating signals from the control section 12 and instructions from the processing section 102.

Storage areas of the same number as the number of display objects configuring the virtual 3D space are provided in the display object information storage section 108, and position and orientation information for a display object, information on the type of display object to be displayed at that position, together with a detail value (resolution information) is stored in each of these storage areas (this stored position and orientation information, display object type information, and detail value is hereinafter called display object information). An example of the display object information stored in the display object information storage section 108 is shown in FIG. 7. Finally, information (object number) that specifies the object used for representing the display object is obtained from the display object type information and detail value stored in this object information storage section 108.

The display object information stored in the display object information storage section 108 is read out by the virtual 3D space setting section 104. At that point, display object information for the frame before the current frame is stored in the display object information storage section 108. Display object information (position and orientation information) for the current frame is obtained by the virtual 3D space setting section 104 on the basis of the thus read-out display object information and movement information computed by the movement information computation section 106. Note that this processing is not necessary for a static object because there is no such movement information and thus the display object information therefor does not change.

In this manner, display object information for all the display objects that configure the virtual 3D space for the current frame is set by the virtual 3D space setting section 104. Note that a map setting section 110 selects a map for only those portions that are affected when a segmented map is to be displayed in the virtual 3D space.

With this embodiment of the invention, the sequence number detail table 112 (FIGS. 11A and 11B) and the distance detail table 114 (FIG. 12) comprised within the virtual 3D space computation section 100 are used to allocate high-, medium-, or low-detail object image information (FIGS. 13A to FIG. 13C) to the display object. The description below deals with a racing car by way of example, but the display objects implemented by the processing described below are not limited to a moving body such as a racing car. For example, the same processing could equally well be used for display objects such as the buildings 60 and arches 62 in FIG. 3.

Figure 8:
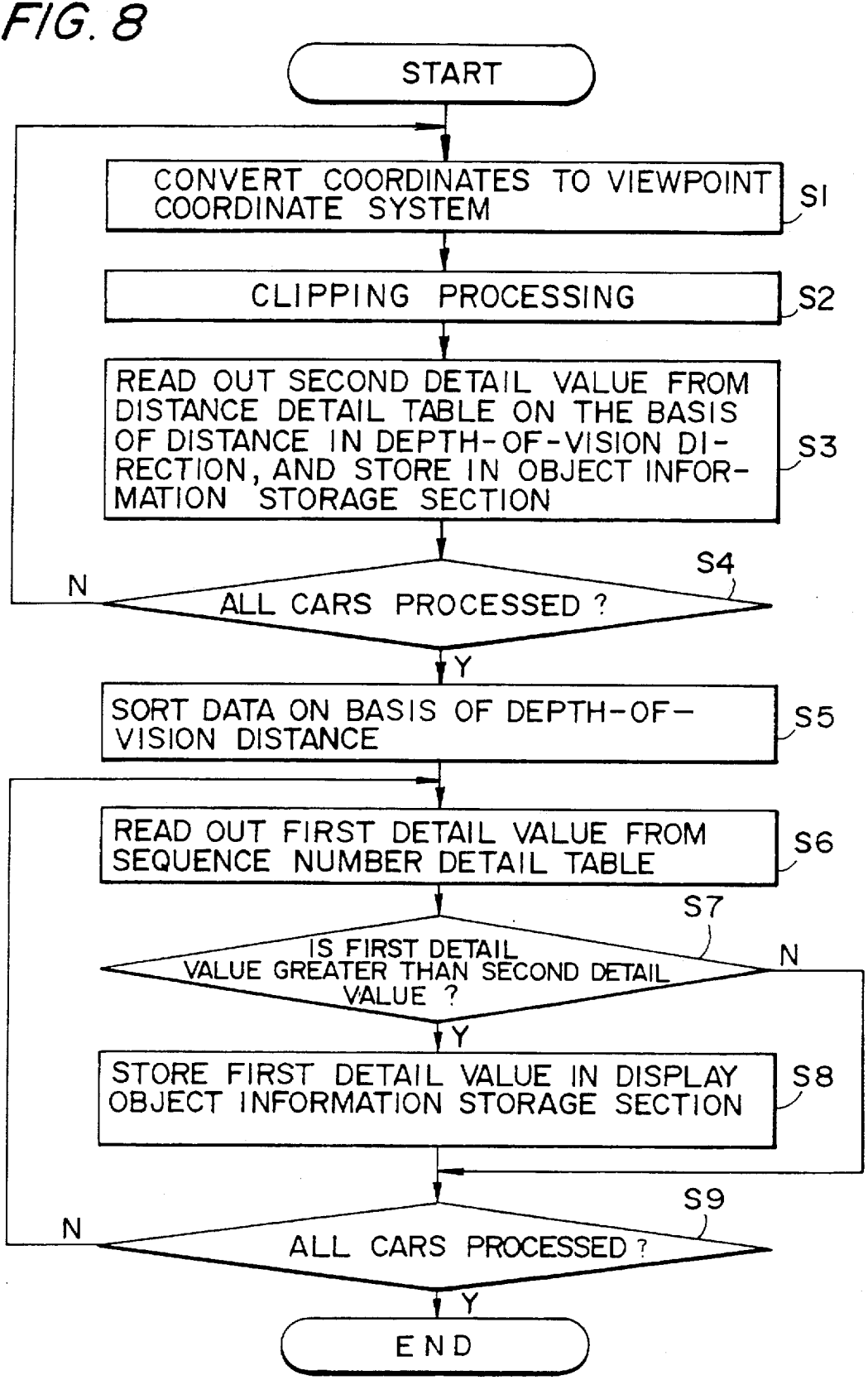
FIG. 8 is a flowchart of an example of the allocation processing of this embodiment.

A flowchart of an example of the allocation processing of this embodiment is shown in FIG. 8. First of all, in a step S1, the coordinates of a representative point of the racing car are subjected to coordinate conversion into the viewpoint coordinate system. Taking the positions of racing cars a to i (where a is the player's own car) shown in FIG. 9 by way of example, the coordinates of representative points of the racing cars b to i are each converted into the viewpoint coordinate system based on the position of the player's own car a. Next, in a step S2, clipping is performed in accordance with the field-of-view range and a depth-of-vision range. If, for example, clipping is performed in accordance with a field-of-view range defined by lines P and Q and a depth-of-vision range defined by a line R in FIG. 9, each of the racing cars h and i positioned outside the region bounded by the lines P, Q, and R is excluded from subsequent processing.

Figure 9:
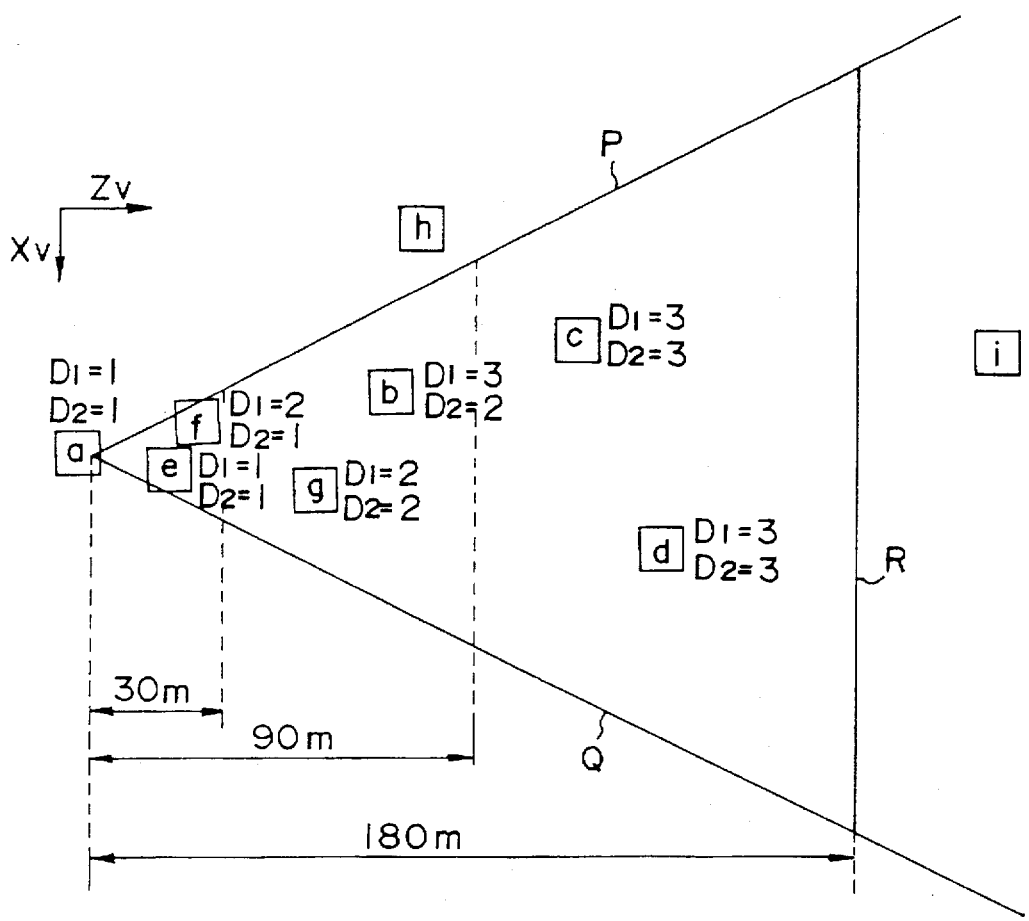
FIG. 9 shows an example of the positions of racing cars.
Figure 13A:
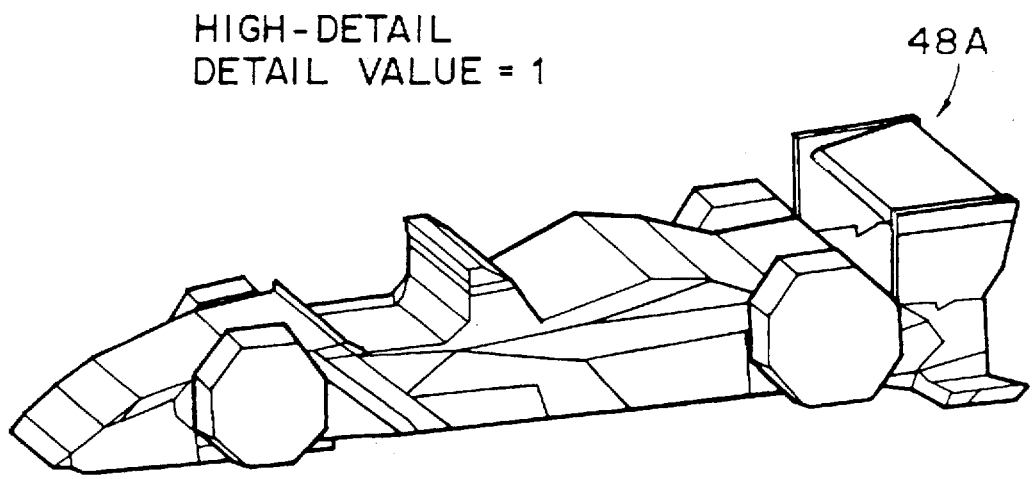
FIGS. 13A to 13C show image information for a plurality of types of objects with differing numbers of polygons.
Figure 13B:
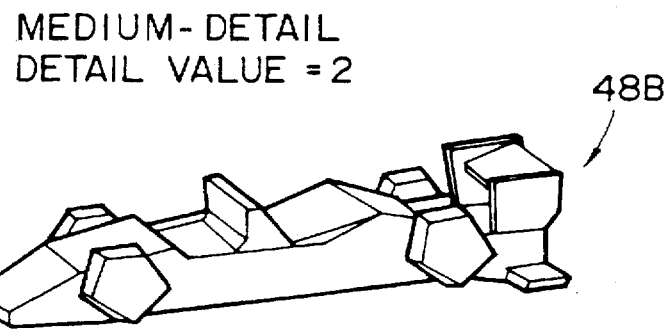
Figure 13C:
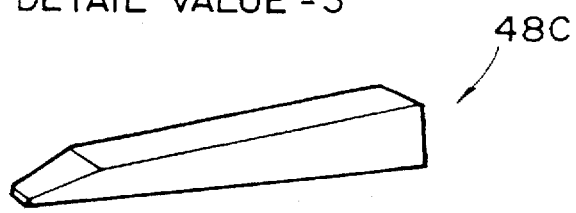

In a step S3, a second detail value is read out from the distance detail table 114 on the basis of distance in the depth-of-vision direction, that is, the Zv direction in FIG. 9, and this second detail value is stored in a detail value storage area of the display object information storage section 108. In this case, a detail value (second detail value) that is set on the basis of the distance range from the viewpoint of the player is stored in the distance detail table 114, as shown in FIG. 12. For example, a detail value of 1 is stored for a position within a distance range of 0 m≦L<30 m, a detail value of 2 is stored for a position within a distance range of 30 m≦L<90 m, and a detail value of 3 is stored for a position within a distance range of 90 m≦L. Each of these detail values 1, 2, and 3 specifies high-, medium-, or low-detail object image information, respectively, as shown in FIGS. 13A to 13C. These detail values make it possible to specify objects with differing numbers of polygons as the objects used to represent a display object. Since each of the racing cars a, e, and f in FIG. 9, for example, is within the distance range 0≦L<30, 1 is read out from the distance detail table 114 therefor as the second detail value D2 (note that the detail value for the player's own car is always 1). Similarly, D2 is 2 for each of the racing cars g and b, and 3 for each of the racing cars c and d. Each of the thus read-out second detail values is stored in the detail value storage area of the display object information storage section 108. In other words, the data in FIG. 7 is: Da=1, Db=2, Dc=3, Dd=3, . . . . If it is determined that the above processing has been performed for all of the racing cars (in a step S4), the flow proceeds to a step S5.

The data is then sorted on the basis of depth-of-vision distance Zv in step S5. In other words, the display object information for the example of FIG. 9 is rearranged into the sequence of racing cars: e, f, g, b, c, then d. In this case, the player's own car a is not sorted and it always has the highest priority. A first detail value is then read out in sequence from the sequence number detail table 112, in a step S6. In this case, a detail value (first detail value) corresponding to the sequence number group given to each racing car is stored in the sequence number detail table 112 as shown in FIGS. 11A and 11B. In the sequence number detail table for the main screen that is shown in FIG. 11A, detail value 1 is stored for the group of sequence numbers 1 and 2 (the first and second racing cars, where the first one is the player's own car), detail value 2 is stored for the group of sequence numbers 3 and 4, and detail value 3 is stored for the group of sequence numbers from 5 onward. Similarly, in the sequence number detail table for the side mirror that is shown in FIG. 11B, detail value 2 is stored for the group of sequence numbers 1 and 2, and detail value 3 is stored for the group of sequence numbers from 3 onward. It is not necessary to draw a highly detailed image for the side mirror. Thus, in this embodiment, the sequence number detail table for the side mirror does not contain detail values that specify highly detailed object image information.

When the first detail values are read out in sequence from the sequence number detail table 112 in this manner, the first detail values are read out as: D1=1, 1, 2, 2, 3, 3, 3, . . . . This magnitude of each first detail value D1 is then compared in a step S7 with the magnitude of the second detail value D2 read out from the sorted display object information (which is read out in the sequence of racing cars e, f, g, b, c, then d, for FIG. 9). If the first detail value D1 is the larger, in other words if the detail value that was specified on the basis of the sequence number is the larger, the first detail value D1 is stored in a step S8 in the detail value storage area of the display object information storage section 108, replacing the existing detail value. In this manner, the detail value for racing car f in FIG. 9 is changed from 1 to 2 and that for racing car b is changed from 2 to 3, so that object image information with fewer polygons is used for these racing cars. This makes it possible to prevent problems such as a deterioration of image quality caused by an expansion in the number of polygons to be processed that will be caused by other racing cars crowding close to the player's own car.

Figure 10:
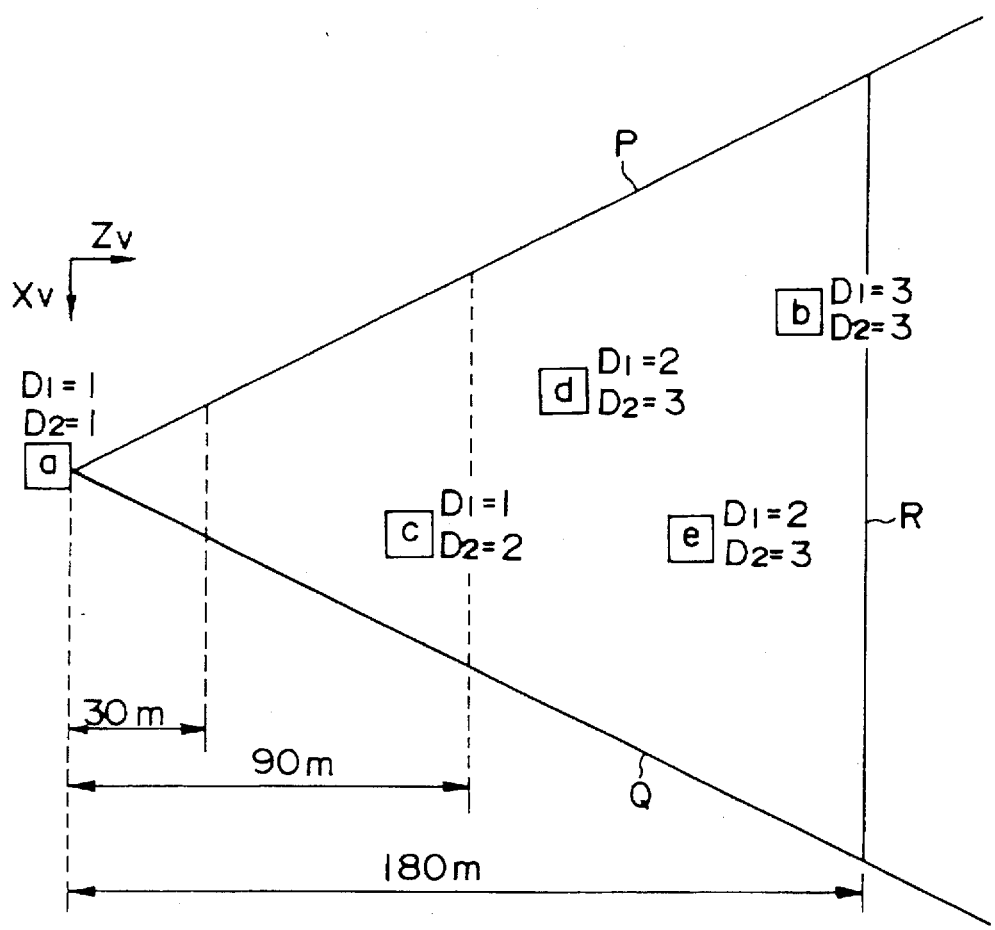
FIG. 10 shows another example of the positions of racing cars.

On the other hand, although the first and second detail values for the racing cars c, d, and e in FIG. 10 are different, for example, there is no need to change the detail values for these cars because D1<D2. Thus the detail value of racing car c is 2 and that of racing cars d and e is 3, so that a detail value that is appropriate for the distance thereof from the viewpoint of the player is allocated to each racing car. In other words, if detail values were allocated solely from the sequence number detail table 112, the racing car c would have detail value 1 and the racing cars d and e would have detail value 2. This would result in racing cars in the far distance being drawn to a high resolution, which would be unnecessary processing. In contrast, this embodiment of the invention allocates detail values to display objects on the basis of the distance detail table 114 in such a case, so that this unnecessary processing does not occur.

After the detail value has been set for a display object by the virtual 3D space computation section 100 as described above, processing is done to obtain information specifying the object representing that display object (that is, the object number) on the basis of this detail value and display object type information. The thus obtained object number and display object information is output to the image synthesis section 200. The computations to obtain the object number are such that highly detailed racing car object is specified if the type of display object is a racing car with detail value 1, a medium-detail racing car object is specified for detail value 2, and a low-detail racing car object is specified for detail value 3, for example.

Note that two resolution information tables, the sequence number detail table 112 and the distance detail table 114, are provided in the above embodiment and the resolution is set therefrom. However, as an alternative, a single resolution information table in which sequence number groups and distance ranges are arrayed in a two-dimensional fashion along an X-axis and a Y-axis could be provided, and the resolution could be set by using this resolution information table. In other words, detail values corresponding to combinations of sequence number group and distance range are stored in this table. A detail value is read out from this resolution information table on the basis of the sequence number group and distance range to which a racing car belongs, to set the resolution for that racing car.

4. Description of Image Synthesis Section

A pseudo-3D image as seen from any desired viewpoint of the player within the virtual 3D space is synthesized by the image synthesis section 200. This image synthesis section 200 comprises an image supply section 210 and an image forming section 228, as shown in FIG. 6, and the image supply section 210 further comprises the object image information storage section 212. Object image information for a plurality of types of objects having different resolutions (numbers of polygons) such as those shown in FIGS. 13A to 13C is stored in the object image information storage section 212. The type of object image information that is specified is determined by the object number within the display object information that is input from the virtual 3D space computation section 100 (the object number is obtained from the detail value and display object type information).

Figure 14:
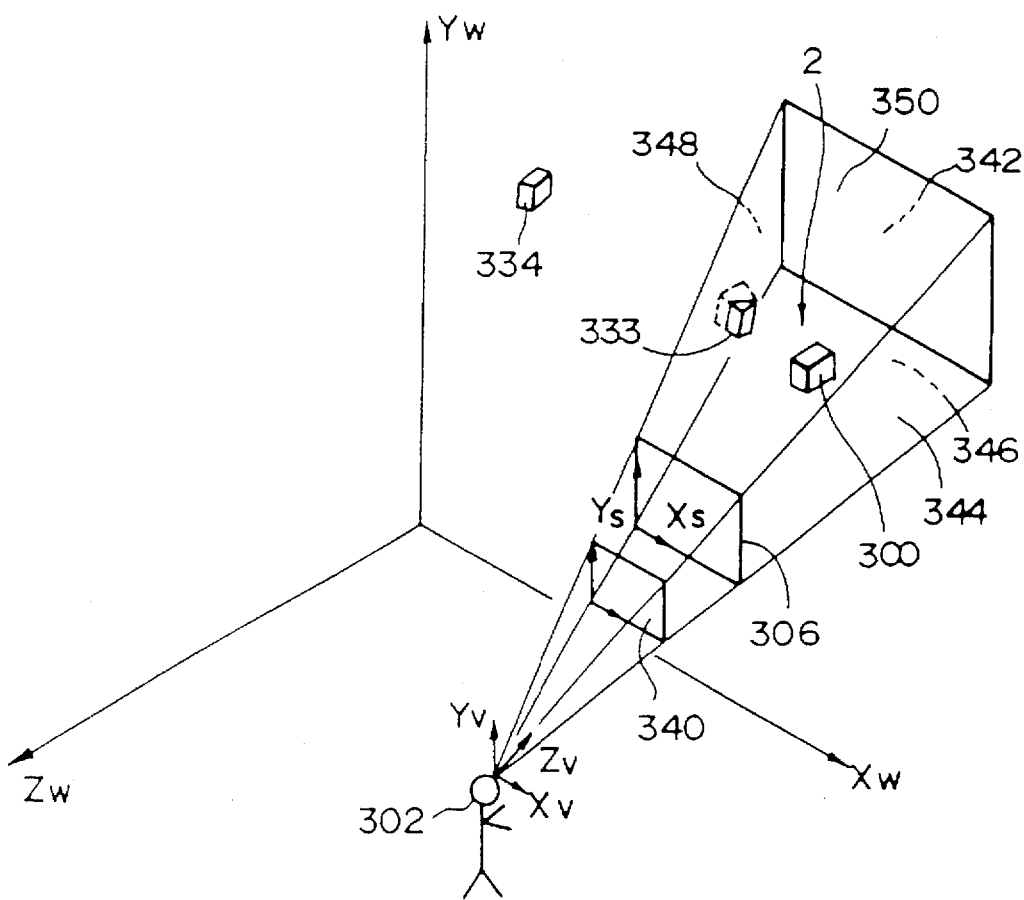
FIG. 14 is a view used for illustrating the 3D computation processing of this embodiment.
Figure 15A:
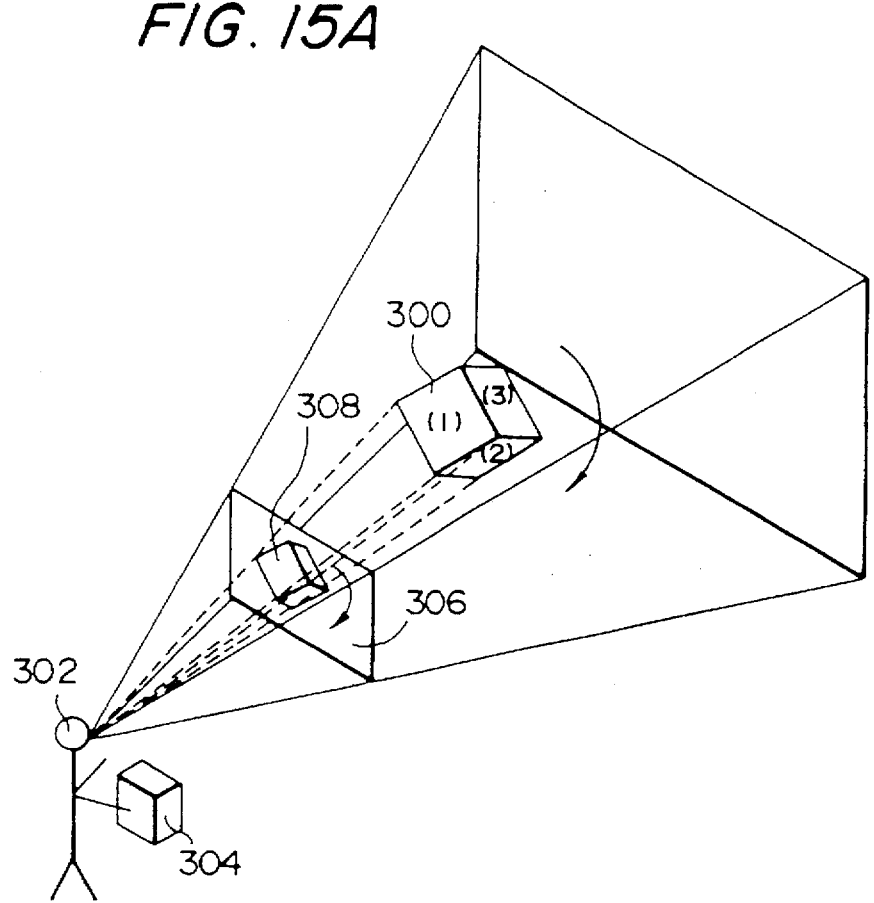
FIG. 15A is a schematic view used for illustrating the concept of the 3D simulator apparatus.
Figure 15B:
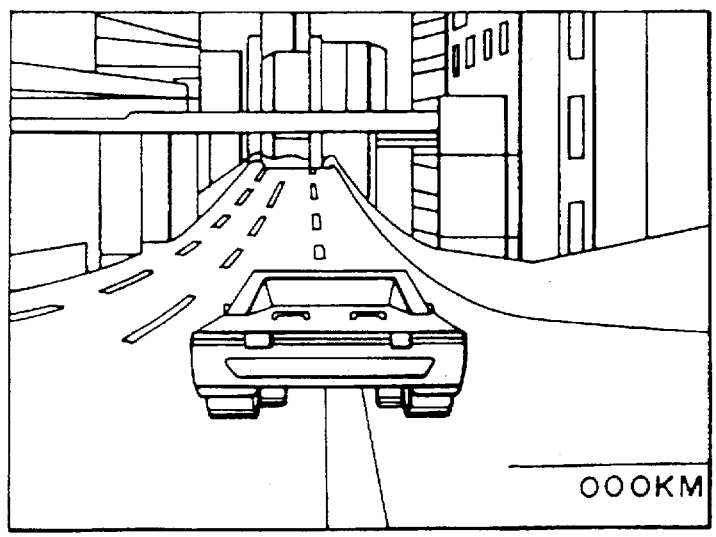
FIG. 15B shows an example of the scene formed by this 3D simulator apparatus.

Various types of coordinate conversion processing and 3D computation processing are performed by the image supply section 210, based on display object information from the virtual 3D space computation section 100 and the thus read-out object image information from the object image information storage section 212. First of all, computations are performed for objects 300, 333, and 334 that depict elements such as a racing car and the track, to place the polygons that configure these objects in a virtual 3D space expressed in absolute coordinates (world coordinates) (XW, YW, ZW), as shown in FIG. 14. The coordinates of each of the polygons configuring these objects are then converted into a viewpoint coordinate system (Xv, Yv, Zv) referenced to the viewpoint of the player 302. A process called clipping processing is then done, followed by perspective projection conversion into a screen coordinate system (XS, YS). Polygons that have been deformed into shapes that are not four-sided are then subjected to polygon format conversion that converts them into four-sided polygons, and finally the data is sorted if necessary.

Note that the coordinate conversion processing and clipping processing that is performed at this point relates the polygon data; it is different from the coordinate conversion processing and clipping processing shown in FIG. 8, which relates to the representative point of each display object.

Image information on all the dots within the polygons is computed by the image forming section 228 from data such as polygon vertex coordinates obtained by the 3D computation processing of the image supply section 210. This makes it possible to form a pseudo-3D image as seen from the player. The computation method used for the image forming in the image forming section 228 could be a method that obtains a peripheral outline of each polygon from the polygon vertex coordinates, obtains a pair of outline points that are at intersections between this peripheral outline and a scan line, and then applies data such as given color data to a line formed between this pair of outline points. A method called texture mapping could also be used in which image information on all the dots within each polygon is previously stored as texture information in means such as read-only memory (ROM), texture coordinates assigned to each vertex of the polygons are used as addresses, and this data is read out and applied.

Note that this invention is not limited to the above described embodiment of this invention; it can be modified in various different ways without departing from the scope of the present invention.

For example, the above embodiment was described as relating to a method in which a resolution for an object representing a display object is first determined by a second setting means (or by using a distance detail table) and then the resolution is modified by a first setting means (or by using a sequence number detail table). However, the present invention should not be taken as being limited to that method; the configuration could be such that the resolution is determined by the first setting means alone, or the resolution is determined by the first setting means then is modified by the second setting means.

Furthermore, the above embodiment was described as using a depth-of-vision distance in the viewpoint coordinate system to determine the distance range to which a display object belongs or the sequence number to be allocated to the display object, but this invention is not limited thereto and another means, such as a straight line connecting the player's viewpoint and the display object could be used instead. The player's viewpoint is similarly not limited to that from the driver's seat of a racing car, for example; it could equally well be set to another position such as from behind the player's own car.

The above embodiment was also described as using a method of modifying the number of polygons of an object representing a display object on the basis of a sequence number group to which a sequence number belongs or a distance range to which the display object belongs. However, another method could be used for modifying the resolution of a display object, such as simulating the action of the suspension of the racing car or the eruption of a backfire from a muffler. In other words, a method could be used in which the action of the suspension is simulated in a racing car whose sequence number group or distance range is closer to the player's viewpoint, but such suspension simulation is not done for a racing car whose sequence number group or distance range is far from the player's viewpoint. In such a case, the detail value 2 in FIG. 11A could be divided into two detail values 2A and 2B, with 2A being the detail value allocated for an additional effect such as the action of the suspension and 2B being the detail value allocated for no suspension action. This makes it possible to implement a more realistic representation, but with a reduced processing time. Note that if any of various other methods is used for modifying this resolution, the resolution setting means 119 of FIG. 1 could perform the resolution setting processing on the basis of the sequence number group and distance range as described below. In other words, when resolution is expressed by a change in the number of polygons, for example, the setting of the resolution by the resolution setting means 119 could be done in such a manner that a display object with a high resolution is represented by an object with a large number of polygons. When resolution is expressed as a suspension action (a change in the shape or parts of the suspension) or a backfire (a change in color or brightness), the setting of the resolution by the resolution setting means 119 could be done in such a manner that a display object in which the suspension changes or a backfire appears is displayed on the screen.

Moreover, it is not necessary for each sequence number group of this invention to comprise a plurality of sequence numbers; the sequence numbers and resolutions could equally well be in a one-to-one relationship. For example, a first racing car could be represented at a high resolution, a second racing car at a next resolution, and a third and subsequent racing cars at a further resolution.

This embodiment was described as relating to a racing car game by way of example, but the present invention is not limited thereto; it can be applied to any other type of game in which a map is formed in a 3D manner, such as a spaceship game, a robot-battling game, a tank-battle game, a fighter-plane game, or a role-playing game.

Similarly, this invention is not limited to an arcade 3D game; it can equally well be applied to other purposes such as a domestic games machine, a flight simulator, or a driving simulator used in an educational establishment such as a driving school. It can also be applied to a large-scale arcade games machine or simulator where a large number of players can participate.

The computations performed by the virtual 3D space computation means and image synthesis means of this invention could equally well be performed by a dedicated image processing device, and all or part of the computations could be performed by software means using a general-purpose microprocessor or digital signal processor (DSP).

Note that the method described below could be used when the processing is by software. A given program such as a games program is stored in an information storage medium such as a CD-ROM or floppy disk, or in memory such as ROM within the apparatus itself. This program could then be read into a programmable integrated circuit device such as a microprocessor or DSP, to implement the computations performed by means such as the virtual 3D space computation means and the image synthesis means.

Furthermore, the computations performed by the virtual 3D space computation means and image synthesis means are not limited to those described with reference to this embodiment.

This invention could also be applied to a 3D simulator apparatus that has a configuration in which a display called a head-mounted display (HMD) is used for the synthesized pseudo-3D image.

I claim:

1. A three-dimensional (3D) simulator apparatus comprising:

image synthesis means for synthesizing a field-of-view image as seen from a given viewpoint within a virtual 3D space; and first setting means for setting the resolution of a display object having a sequence number included in a Kth sequence number group to a higher level than the resolution of a display object having a sequence number included in a (K+1)th sequence number group, first to Mth (where M is an integer) sequence number groups grouping sequence numbers that are allocated to display objects in sequence of increasing distance from said viewpoint, said Kth (where K is an integer such that $1 \leq K < M$) sequence number group including a sequence number that is allocated to a display object closer to said viewpoint than said (K+1)th sequence number group.

2. The 3D simulator apparatus as defined in claim 1, further comprising:

second setting means for setting the resolution of a display object positioned within an Lth distance range to a higher level than the resolution of a display object positioned within an (L+1)th distance range, first to Nth (where N is an integer) distance ranges demarcating distances between said viewpoint and display objects, said Lth (where L is an integer such that $1 \leq L < N$) distance range being closer to said viewpoint than said (L+1)th distance range; and means for modifying the resolution of a display object set by said second setting means in accordance with the setting of said first setting means.

3. The 3D simulator apparatus as defined in claim 1, further comprising:

second setting means for setting the resolution of a display object positioned within an Lth distance range to a higher level than the resolution of a display object positioned within an (L+1)th distance range, first to Nth (where N is an integer) distance ranges demarcating distances between said viewpoint and display objects, said Lth (where L is an integer such that $1 \leq L < N$) distance range being closer to said viewpoint than said (L+1)th distance range; and means for modifying the resolution of a display object set by said first setting means in accordance with the setting of said second setting means.

4. The 3D simulator apparatus as defined in claim 1, wherein:

said distance between said viewpoint and each display object is a distance in a depth-of-vision direction of a viewpoint coordinate system.

5. The 3D simulator apparatus as defined in claim 1, wherein:

said distance between said viewpoint and each display object is the distance of a straight line connecting said viewpoint and each display object.

6. The 3D simulator apparatus as defined in claim 1, wherein said 3D simulator apparatus further comprises:

means for storing image information for an object when each of display objects is represented by an object configured by a plurality of polygons; wherein:

said object image information storage means stores image information for a plurality of types of objects with differing numbers of polygons, for at least some of said display objects; and an object with a larger number of polygons is selected from said plurality of types of objects for allocation to said display object as the resolution set for said display object increases.

7. A three-dimensional (3D) simulator apparatus comprising:

image synthesis means for synthesizing a field-of-view image as seen from a given viewpoint within a virtual 3D space; and means for setting resolutions of display objects in such a manner that the resolution of a display object closer to said viewpoint is higher, on the basis of a sequence number group to which a sequence number allocated to said display object belongs and a distance range within which said display object is positioned, first to Mth (where M is an integer) sequence number groups grouping sequence numbers that are allocated to display objects in sequence of increasing distance from said viewpoint, a Kth (where K is an integer such that 1≦K<M) sequence number group including a sequence number that is allocated to a display object closer to said viewpoint than a (K+1)th sequence number group, first to Nth (where N is an integer) distance ranges demarcating distances between said viewpoint and display objects, an Lth (where L is an integer such that 1≦L<N) distance range being closer to said viewpoint than an (L+1)th distance range.

8. A three-dimensional (3D) simulator apparatus comprising:

image synthesis means for synthesizing a field-of-view image as seen from a given viewpoint within a virtual 3D space;

a first resolution information table for storing first resolution information, which is information specifying resolutions for display objects and which is linked to first to Mth sequence number groups, first to Mth (where M is an integer) sequence number groups grouping sequence numbers that are allocated to display objects in sequence of increasing distance from said viewpoint, a Kth (where K is an integer such that 1≦K<M) sequence number group including a sequence number that is allocated to a display object closer to said viewpoint than a (K+1)th sequence number group;

a second resolution information table for storing second resolution information, which is information specifying resolutions for display objects and which is linked to first to Nth distance ranges, first to Nth (where N is an integer) distance ranges demarcating distances between said viewpoint and display objects, an Lth (where L is an integer such that 1≦L<N) distance range being closer to said viewpoint than an (L+1)th distance range; and means for reading out said second resolution information from said second resolution information table on the basis of a distance range within which a display object is positioned, reading out said first resolution information from said first resolution information table on the basis of a sequence number group to which a sequence number of said display object belongs, and allocating said first resolution information to said display object when said first resolution information specifies a resolution that is lower than that of said second resolution information.

9. An image synthesis method comprising:

a step of synthesizing a field-of-view image as seen from a given viewpoint within a virtual three-dimensional (3D) space;

a first setting step of setting the resolution of a display object having a sequence number included in a Kth sequence number group to a higher level than the resolution of a display object having a sequence number included in a (K+1)th sequence number group, first to Mth (where M is an integer) sequence number groups grouping sequence numbers that are allocated to display objects in sequence of increasing distance from said viewpoint, said Kth (where K is an integer such that 1≦K<M) sequence number group including a sequence number that is allocated to a display object closer to said viewpoint than said (K+1)th sequence number group.

10. The image synthesis method as defined in claim 9, further comprising:

a second setting step of setting the resolution of a display object positioned within an Lth distance range to a higher level than the resolution of a display object positioned within an (L+1)th distance range, first to Nth (where N is an integer) distance ranges demarcating distances between said viewpoint and display objects, said Lth (where L is an integer such that 1≦L<N) distance range being closer to said viewpoint than said (L+1)th distance range; and a step of modifying the resolution of a display object set by said second setting step in accordance with the setting by said first setting step.

11. The image synthesis method as defined in claim 9, wherein:

a given object image information storage means stores image information for an object when each of display objects is represented by an object configured by a plurality of polygons, and also stores image information for a plurality of types of objects with differing numbers of polygons, for at least some of said display objects; and an object with a larger number of polygons is selected from said plurality of types of objects for allocation to said display object as the resolution set for said display object increases.

12. An image synthesis method comprising:

a step of synthesizing a field-of-view image as seen from a given viewpoint within a virtual three-dimensional (3D) space;

a step of setting resolutions of display objects in such a manner that the resolution of a display object closer to said viewpoint is higher, on the basis of a sequence number group to which a sequence number allocated to said display object belongs and a distance range within which said display object is positioned, first to Mth (where M is an integer) sequence number groups grouping sequence numbers that are allocated to display objects in sequence of increasing distance from said viewpoint, a Kth (where K is an integer such that $1 \leq K < M$) sequence number group including a sequence number that is allocated to a display object closer to said viewpoint than a (K+1)th sequence number group, first to Nth (where N is an integer) distance ranges demarcating distances between said viewpoint and display objects, an Lth (where L is an integer such that $1 \leq L < N$) distance range being closer to said viewpoint than an (L+1)th distance range.

* * * * *